Patented June 30, 1953

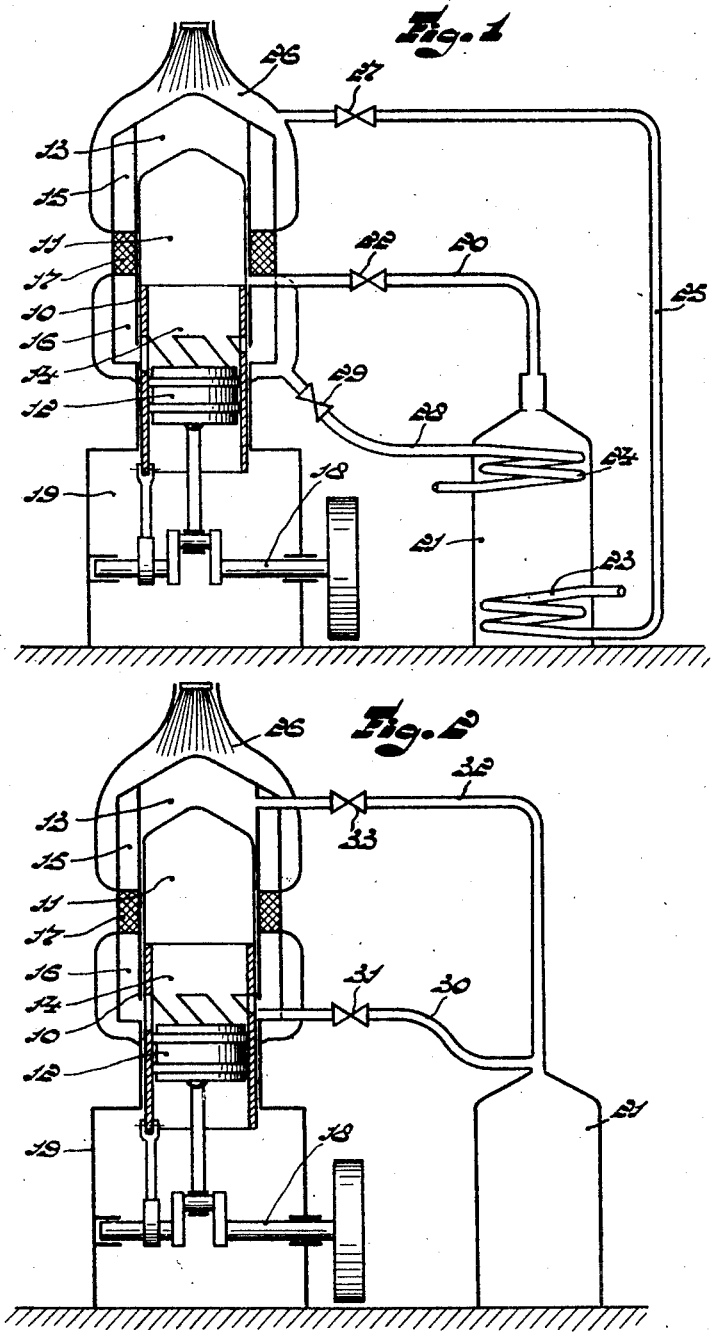

2,643,508

UNITED STATES PATENT OFFICE 2,643,508

HOT-GAS MOTOR WITH MEANS FOR REGULATING THE INDICATED POWER THEREOF

Pieter Hajo Clay, deceased, late of Eindhoven, Netherlands, by Jacob Clay, Tettje Clasina Clay-Jolles and Petronella van Osselen-Clay, joint heirs, all of Amsterdam, Netherlands; Joris Daniel Heijligers, administrator of said Pieter Hajo Clay, deceased, assignor to Hartford National Bank and Trust Company, Hartford, Conn., as trustee Application September 7, 1945, Serial No. 615,044
In the Netherlands August 13, 1943

Section 1, Public Law 690, August 8, 1946
Patent expires August 13, 1963

5 Claims. (Cl. 60—24)

This invention relates to means for and a method of regulating the indicated power of a hot-gas motor by using a minimum number of moving parts.

Regulation is effected in a manner already suggested by making the contents of the motor cylinder to communicate with a separate chamber containing a gas which may serve for the filling of the motor cylinder. The gaseous pressure in this separate chamber is increased or decreased according as it is intended that either a greater amount of gas should take part in the cyclic process or gas should be abstracted from it, in order thus to be able to vary the indicated power.

A primary object of this invention is to provide means initiated by the thermal input to the engine for regulating the power output of a hot-gas engine.

Other objects, features and advantages of the present invention will be apparent from the description hereinafter.

In the drawing:

Figure 1 is a vertical diagrammatic view of one embodiment of the invention with a displacer piston shown in partial section; and Figure 2 is another embodiment of the invention in a drawing similar to Figure 1 in a more simplified construction.

According to the present invention, the variation in pressure of the gas in this separate chamber is effected by varying the temperature of the gas in this chamber. Hot gas motors, as a matter of course, are equipped with heaters for heating the working medium utilized in the said motors. The high temperatures necessary in the heaters are usually obtained by passing a hot fluid medium in heat exchange relationship with the said heaters. Such hot fluid medium may then serve in addition to supply heat to the gas in the separate chamber by passing in heat exchange relationship therewith as well. When an increase in power must soon be followed by a decrease in power, the gas in the said chamber may be cooled down again artificially, if desired, with the aid of the cooling liquid already present for the motor.

Hot-gas motors adapted to the use of the above-described method of regulation comprise a separate chamber containing means whereby heat can be supplied to the gas in this chamber or abstracted from it. This chamber communicates with the motor cylinder through a channel capable of being closed. By opening a valve provided in this channel the separate chamber is made to communicate with the cylinder. If the pressure in this chamber is higher than the average pressure in the motor cylinder during the cyclic process there will be a current of gas from the separate chamber to the motor cylinder, resulting in an increase of the indicated power of the motor. If the pressure in the auxiliary chamber is lower, the indicated power will decrease in entirely the same manner.

The invention will be explained more fully by reference to the accompanying drawing showing, by way of examples, two embodiments thereof.

In Fig. 1, reference 10 indicates the cylinder of a hot-gas motor in which a displacer 11 and a piston 12 are movable. The displacer 11 divides the cylinder space into two portions, viz, the hot chamber 13 and the cold chamber 14. In this hot chamber the gas during operation of the motor is solely at a high temperature which it receives from the heater 15. The gas reaches the cold chamber through the cooler 16 in which the amount of heat still present after expansion is given off. Between the cooler 16 and heater 15 is a regenerator 17. Piston 12 and displacer 11 are driven from the common crank shaft 18 arranged in the crank case 19.

The contents of the cylinder 10 communicate with a separate container 21 by means of a conduit 20 which is coupled to the cold chamber 14. The container 21 contains a gas under a definite pressure, usually the same gas as that with which the motor cylinder is filled. The pipe line 20 is provided with a value 22 enabling the cylinder to be either communicated or not communicated with the container 21. The latter contains below and above two spirals 23 and 24 or heating and cooling means respectively. The lower spiral 23 communicates with the flue-gas channel means 26 of the heating device for the hot-gas motor by means of a pipe line 25 capable of being closed. By opening the value 27 provided in the conduit 25 a portion of the flue gases is led through the spiral 23. In this spiral a certain amount of heat is given off to the gas in the container 21, resulting in an increase of the pressure of the gas in this container. After the line 25 has been closed no further heat is supplied so that the pressure does not increase further. On the contrary, due to radiation of heat the temperature of the gas in the container 21 will slowly decrease, resulting also in a decrease of pressure. If, however, an increase of power must soon be followed by a decrease of power, the cooling of the gas may be effected more rapidly by opening the valve 29, due to which a portion of the cooling water used in the motor is led through the pipe line 28 to the cooling spiral 24.

Fig. 2 shows another form of construction which renders the use of a separate heating spiral and cooling spiral, if any, in the container 21 superfluous. The parts corresponding to Fig. 1 are provided with the same reference numerals. In this case, however, the container 21 is provided with two conduits 30 and 32 capable of being closed, which conducts communicate with the motor cylinder 10. The communicating conduit 30 empties into the cold chamber 14 and the communicating conduit 32 into the hot chamber 13. By opening the valve 33 in the conduit 32 during several revolutions of the crankshaft, a portion of the heated gas periodically flows from the hot chamber 13 to the container 21, giving off heat to the gas in this container. The amount of heat given off and hence the increase in temperature is, putting it broadly, a function of the time during which the valve 33 is opened. The rise in temperature of the gas in the container 21 results, however, in a corresponding increase of pressure so that with each revolution of the crank shaft there flows a little more gas from the container 21 to the motor cylinder than inversely. When the indicated power has increased sufficiently the regulation may be stopped by shutting the valve 33. A decrease of the indicated power is possible by opening the valve 31 instead of the valve 33 and thus bringing the container 21 in communication with the cold chamber of the motor. The above-mentioned regulation can be carried out only if the temporary decrease of power as a result of the addition of the separate chamber 21 does not bring about any interruption of operation.

What is claimed is:

1. A hot-gas motor comprising a motor cylinder, a cooler operatively associated with said cylinder in heat exchange relationship therewith, a separate chamber, flue gas channel means operatively associated with said cylinder in heat exchange relationship therewith, heating means and cooling means within said chamber, means coupling said heating means to said channel means, means coupling said chamber cooling means to said cooler, and means coupling said chamber to said cylinder.

2. A hot-gas engine comprising cylinder means, piston means therein, crankshaft means, means coupling said piston means to said crankshaft means, thermal input means operatively associated with said cylinder means, chamber means, heating means within said chamber means, means including a valve for selectively connecting said heating means to said thermal input means, and circulation duct means between said chamber means and said cylinder means.

3. A hot-gas engine as claimed in claim 2 wherein cooling means are provided in said chamber means.

4. A hot-gas engine comprising cylinder means, piston means therein, crankshaft means, means coupling said piston means to said crankshaft means, thermal input means operatively associated with said cylinder means, engine cooler means, chamber means, substantially spiral heating elements within said chamber means, heat conveying means including a valve for selectively coupling said heating elements to said thermal input means, heat conveying means including a valve for selectively connecting said chamber means to said cylinder means, substantially spiral cooling elements within said chamber means, and liquid conveying means including a valve selectively connecting said engine cooler means to said chamber means.

5. A hot-gas engine comprising cylinder means, piston means therein, crankshaft means, means coupling said piston means to said crankshaft means, thermal input means operatively associated with said cylinder, engine cooler means, chamber means, heat conveying means including a valve for selectively connecting said thermal input means to said chamber means, and cooling-medium conveying means including a valve for selectively connecting said chamber means to said engine cooler means.

JACOB CLAY.
TETTJE CLASINA CLAY-JOLLES.
PETRONELLA van OSSELEN-CLAY.
*Joints heirs of the estate of Pieter Hajo Clay, deceased.*

No references cited.